Dec. 23, 1924.  1,520,617
E. D. TILLYER ET AL
LENS
Filed April 17, 1922
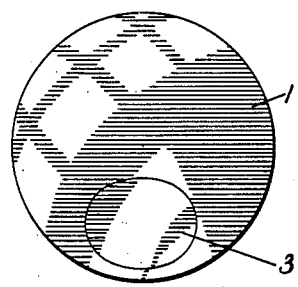
FIG. I
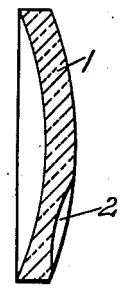
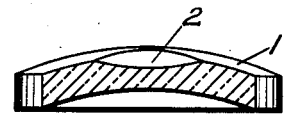
FIG. III
FIG. II
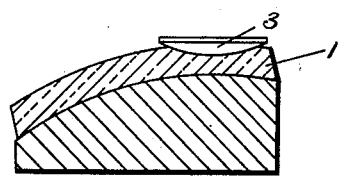
FIG. IV  FIG. V
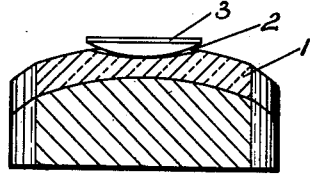
FIG. VI
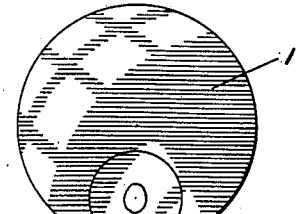
FIG. VII
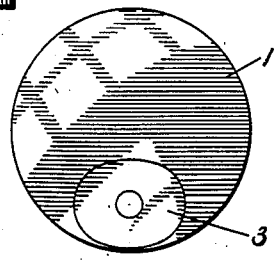
FIG. VIII
INVENTOR
E. D. TILLYER
A. E. GLANCY
BY
ATTORNEYS Patented Dec. 23, 1924.

1,520,617

UNITED STATES PATENT OFFICE.

EDGAR D. TILLYER AND ANNA ESTELLE GLANCY, OF SOUTHBRIDGE, MASSACHUSETTS, ASSIGNORS TO AMERICAN OPTICAL COMPANY, OF SOUTHBRIDGE, MASSACHUSETTS, A VOLUNTARY ASSOCIATION OF MASSACHUSETTS.

LENS.

Application filed April 17, 1922. Serial No. 553,574.

*To all whom it may concern:*

Be it known that we, EDGAR D. TILLYER and ANNA E. GLANCY, citizens of the United States, residing at Southbridge, in the county of Worcester and State of Massachusetts, have invented certain new and useful Improvements in Lenses, of which the following is a specification.

This invention relates to a new and useful bifocal lens and a process in the forming of two part lenses well known in the art as Kryptok lenses. It is a well known fact that in a finished lens of this type, the oblique vision thru the reading portion of the lens has an optical astigmatism which is quite pronounced and objectionable.

One of the main objects of our invention is to provide an improved bifocal lens formed of two pieces of glass and which will be practically free from the objectionable astigmatism present in the reading portion of prior art lenses of this type. Another object of our invention is to introduce a new and improved process for forming two part lenses whereby to eliminate the objectionable astigmatism whereby to produce a reasonably correct oblique vision or visions thru the reading portion of the lens.

Another object of our invention is the provision of a process which is included in the making of two part lenses wherein the countersink of one of the parts which receives the other part of the lens, is ground in toric form that is, different curvatures in the two major meridians whereby to neutralize the astigmatism introduced and thus provide a finished lens having a substantially correct vision thru the reading portion.

With the above and other objects in view the invention consists in the novel features of construction, the combination and arrangement of parts hereinafter more fully set forth, pointed out in the claims and shown in the accompanying drawings, in which—

Figure I represents a plan view of a two part lens.

Figure II is a side elevation showing the countersink near the lower edge of the lens.

Figure III is a side view illustrating the countersink in the central portion of the lens.

Figure IV is a prospective view of a spherical button used in connection with our improved two part lens.

Figure V is a side elevation of the lens positioned on the supporting block and the button in position for heating, the toric in this power being shown in the countersink as extending vertically of the lens.

Figure VI is a similar view illustrating the toric extending horizontally of the lens.

Figure VII is a plan view illustrating the prior art lens showing the distortion present within this type of lens, and the Figure VIII is a similar view showing the decrease in the distortion and the advantages gained with our improved process.

Referring more particularly to the drawings in which we have illustrated our improved lens and process together with the advantages gained over the lenses in use at the present time, the numeral 1 indicates the body blank of our improved lens having a countersink 2 into which the button 3 is fitted and then heated to a melting point so that the button will readily conform to the shape of the countersink and adhere thereto. The roughened surface of the lens is then ground off leaving a polished two part lens.

In the construction of lenses of this type it has been found that optical astigmatism is present in the marginal portion of what is known as the reading part produced by the combination of the button 3 and the countersink 2, or in other words the power in the marginal portion of the reading portion is different from the true power at the axial portion of the reading portion, a defect usual in all types of lenses. It is, therefore, one of the main objects of our process to reduce the astigmatism in this portion of the lens to a minimum and in order to overcome this astigmatism we have added to the process the grinding of a toric curve in the countersink 2 to neutralize the astigmatism introduced, instead of the usual spherical countersink.

Attention is called to the fact that in some cases it will be necessary to grind the countersink with the strong curve of the toric on a horizontal meridian and in another case it will be necessary to grind this strong curve on a vertical meridian, it depending on the condition of the astigmatism present in the lens. There are errors of focus or power in the marginal portions of the reading portion as well as astigmatic errors and our invention will reduce the focal errors as well as the astigmatic ones.

In general, a lens gives the true required power only along the optic axis. The peripheral portion of a lens does not image the object at the same focal point as the center of the lens. For instance, in the case of oblique vision through the reading portion of a fused bifocal we are concerned with two aberrations, (besides the chromatic) namely, an error in the power and a cylinder action or astigmatism. In other words, if the object is a wire mesh having rectangular lines, the best possible image is at a different distance from the lens than it would be if seen along the optic axis, and furthermore, if one set of lines is made sharp the other set of lines is out of focus.

For a given lens the amount of these two aberrations; (1) error in power, (2) astigmatism, can be calculated by standard text book formulae for any chosen point; for instance, a point five millimeters below the dividing line. Since the countersink surface is concerned only with the reading portion we have at hand a means of correcting the reading errors without altering the distance portion. Hence the countersink curve, which has always been made spherical heretofore, can be made toric to compensate for the errors of oblique vision. The axis of the toric may be in any orientation, depending upon the prescription, but for a spherical prescription it will be either horizontal or vertical.

It is to be noticed that the countersink being of crown glass, fusion does not alter the curves, whereas if the flint button were made toric fusion would destroy the toric character of the button. A toric button cannot be substituted for a toric countersink.

In the process of forming a lens of this character attention is called to the fact that the button 3 is a spherical button fitted into a toric countersink 2 while the prior art has disclosed a spherical countersink with a toric button for a different purpose. With our improved combination, as shown in Figure VI, the necessity of wedges and other means for blocking the button to position the same within the countersink for heating can be eliminated, as the button will rest within the countersink in the position illustrated in Figure VI so that when the button is heated to a melting point the edges of the button will drop downwardly and conform to the shape of the countersink, allowing the air to escape, thus preventing bubbles, etc.

From the above it will be readily apparent that by grinding the countersink 2 in a toric form and by having the spherical button to be fitted within the countersink in the proper axial relationship it will neutralize the astigmatism introduced, thus giving a reasonably correct oblique vision or visions thru the reading portion which is always oblique. It will be noted that by grinding a toric in the countersink on the proper line in accordance with the position of the astigmatism present in the lens it will provide a lens of less distortion and with more accurate power than with the present process of grinding and forming these two part lenses.

We are well aware of the fact that lenses of this nature have been constructed heretofore with a toric button and a spherical countersink but fully believe that the process of constructing lenses as set forth above is entirely new in the art.

We claim:—

1. A two part bifocal lens comprising a major blank having a toric countersink formed therein and a segment of different refractive index secured within and filling the countersink, for the purpose set forth.

2. A two part bifocal lens comprising a major blank having a countersink formed therein having a difference in curvature in the two major meridians and a segment of different refractive index secured within the countersink, for the purpose set forth.

3. A two part bifocal lens comprising a major blank having a curved countersink formed therein to produce a reading portion of spherical power, said countersink being of unequal curvature in the two major meridians, the curvatures being positioned to counteract and neutralize oblique errors present in the marginal portion of a spherical countersink, and a segment of different refractive index secured in the countersink.

4. A bifocal lens having a major vision field and a laterally displaced minor vision field determined by curved surfaces having a known focal effect in combination, one at least of said curved surfaces departing from true spherical form inversely of the departure from true focal effect produced by oblique vision through the laterally displaced vision field to maintain the desired focal effect in said field.

5. A two part bifocal lens comprising a major blank having a curved countersink formed therein to produce a reading portion of spherical power, said countersink being of unequal curvature in the two major meridians, the curvatures being positioned to counteract and neutralize oblique errors of astigmatism present in the marginal portion of a spherical countersink, and a segment of different refractive index secured in the countersink.

EDGAR D. TILLYER.
A. ESTELLE GLANCY.